US009232034B2

(12) United States Patent
Dokai et al.

(10) Patent No.: US 9,232,034 B2
(45) Date of Patent: Jan. 5, 2016

(54) COMMUNICATION TERMINAL DEVICE INCLUDING A UHF-BAND RFID SYSTEM

(71) Applicant: Murata Manufacturing Co., Ltd., Nagaokakyo-shi, Kyoto-fu (JP)

(72) Inventors: Yuya Dokai, Nagaokakyo (JP); Tsuyoshi Mukai, Nagaokakyo (JP); Masato Nomura, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/560,274

(22) Filed: Dec. 4, 2014

(65) Prior Publication Data

US 2015/0087362 A1    Mar. 26, 2015

Related U.S. Application Data

(63) Continuation of application No. PCT/JP2013/076970, filed on Oct. 3, 2013.

(30) Foreign Application Priority Data

Oct. 5, 2012  (JP) ................................. 2012-223440

(51) Int. Cl.
*H04M 1/00*  (2006.01)
*H04M 1/02*  (2006.01)
(Continued)

(52) U.S. Cl.
CPC ........... *H04M 1/026* (2013.01); *G06K 7/10346* (2013.01); *G06K 7/10386* (2013.01); *H01Q 1/243* (2013.01); *H01Q 9/42* (2013.01); *H04M 2250/04* (2013.01)

(58) Field of Classification Search
CPC ........... H01Q 7/00; H01Q 9/285; H01Q 9/26; H01Q 1/243; H01Q 1/242; H01Q 1/2225
USPC ........................................... 455/575.7, 575.1
See application file for complete search history.

(56) References Cited

U.S. PATENT DOCUMENTS 7,830,311 B2 * 11/2010 Kataya et al. .......... 343/700 MS
2004/0224652 A1   11/2004 Hara
(Continued)

FOREIGN PATENT DOCUMENTS

JP      2004-213582 A      7/2004
JP      2004-343699 A     12/2004
(Continued)

OTHER PUBLICATIONS

Official Communication issued in International Patent Application No. PCT/JP2013/076970, mailed on Dec. 24, 2013.
(Continued)

*Primary Examiner* — Nay A Maung
*Assistant Examiner* — Angelica M Perez
(74) *Attorney, Agent, or Firm* — Keating & Bennett, LLP

(57) ABSTRACT

A communication terminal device includes a UHF-band RFID system including a wireless IC element for UHF-band RFID and a loop-shaped conductor coupled to the wireless IC element for UHF-band RFID, and a UHF-band mobile communication system including a wireless IC element for UHF-band mobile communication and an antenna conductor coupled to the wireless IC element for UHF-band mobile communication. The loop-shaped conductor and the antenna conductor are closely adjacent to each other. The loop-shaped conductor is electromagnetically coupled to a portion of the antenna conductor.

15 Claims, 9 Drawing Sheets

(51) Int. Cl.
  *H01Q 9/42* (2006.01)
  *G06K 7/10* (2006.01)
  *H01Q 1/24* (2006.01)

(56) References Cited

U.S. PATENT DOCUMENTS

| | | | |
|---|---|---|---|
| 2005/0059372 A1 | 3/2005 | Arayashiki et al. | |
| 2009/0262041 A1* | 10/2009 | Ikemoto et al. | 343/860 |
| 2011/0084888 A1 | 4/2011 | Nishioka et al. | |
| 2011/0090058 A1* | 4/2011 | Ikemoto | 340/10.1 |

FOREIGN PATENT DOCUMENTS

| | | | | |
|---|---|---|---|---|
| JP | 2005-020121 A | 1/2005 | | |
| JP | 2005-094282 A | 4/2005 | | |
| JP | 2007-306287 A | 11/2007 | | |
| JP | 2008-211740 A | 9/2008 | | |
| JP | 2010-016456 | * 1/2010 | H01Q 21/28 |
| JP | 2010-016456 A | 1/2010 | | |
| JP | 2011-135307 A | 7/2011 | | |
| JP | 2012-016062 A | 1/2012 | | |
| WO | 2009/011154 A1 | 1/2009 | | |
| WO | 2010/001987 A1 | 1/2010 | | |
| WO | 2011/122162 A1 | 10/2011 | | |

OTHER PUBLICATIONS

Official Communication issued in corresponding Japanese Patent Application No. 2014-520851, mailed on Jul. 8, 2014.

* cited by examiner

F I G. 2
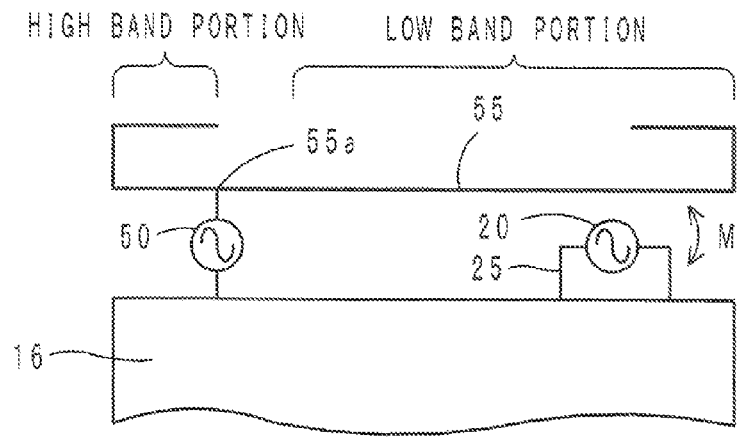
F I G. 3
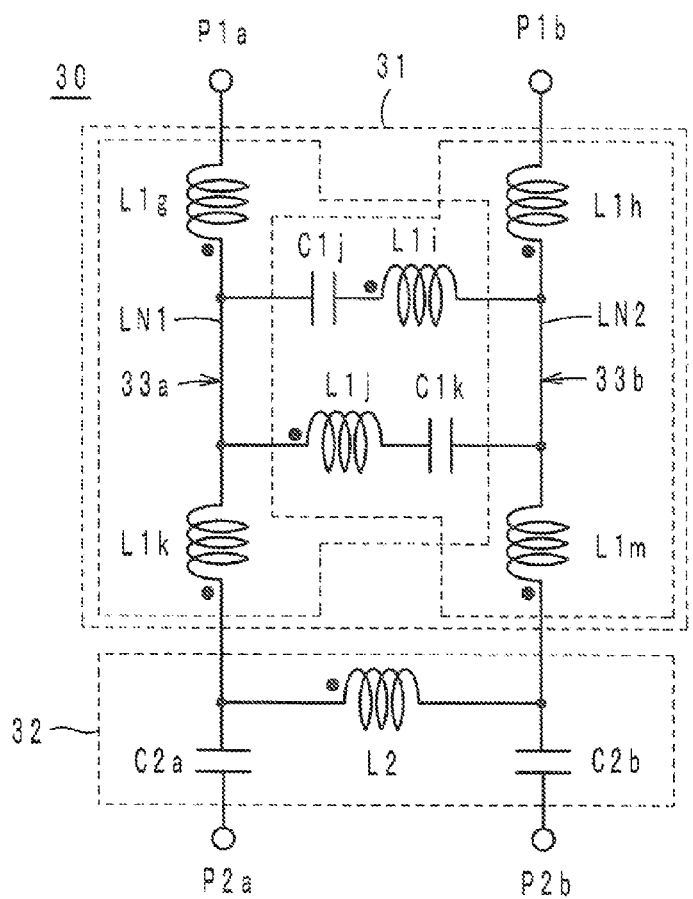

F I G. 7
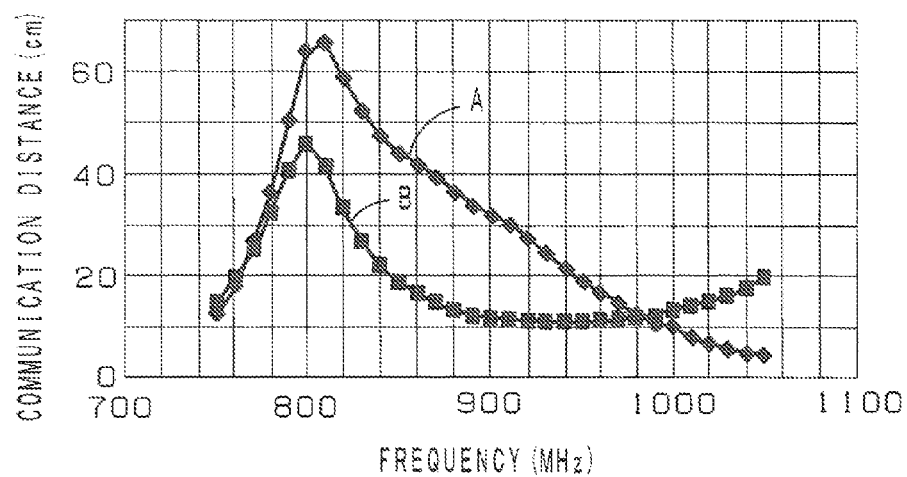
F I G. 8
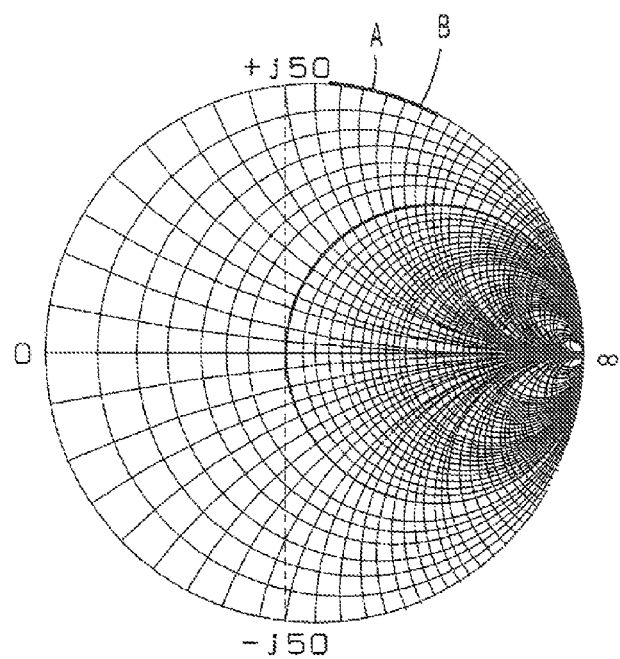

F I G . 9
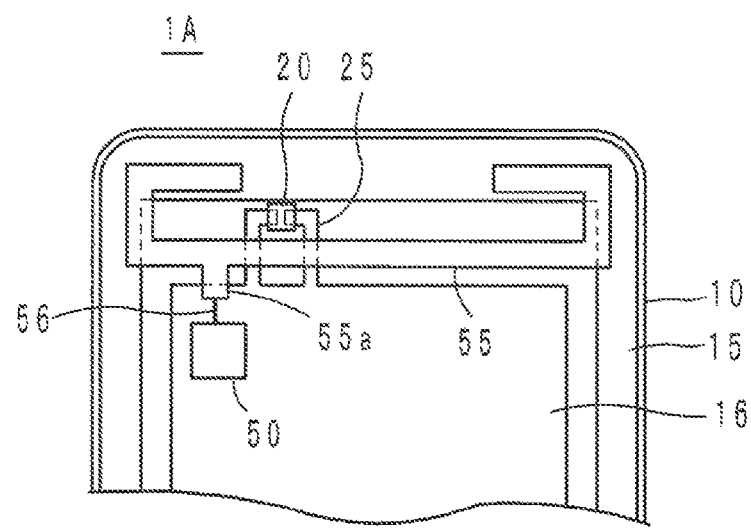
F I G . 1 0
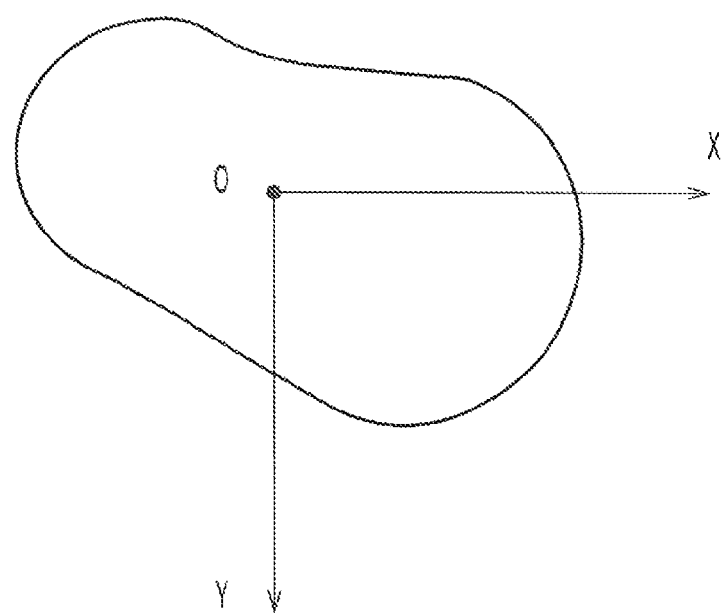

COMMUNICATION TERMINAL DEVICE INCLUDING A UHF-BAND RFID SYSTEM

This application is based on Japanese Patent Application No. 2012-223440 filed on Oct. 5, 2012 and PCT/JP2013/076970 filed on Oct. 3, 2013, the entire contents of which are incorporated herein by reference.

BACKGROUND OF THE INVENTION

1. Field of the Invention

The present invention relates to communication terminal devices and specifically to communication terminal devices including a UHF-band RFID (Radio Frequency Identification) system and a UHF-band mobile communication system.

2. Description of the Related Art

The UHF-band RFID system provides a longer communication distance than the HF-band RFID system and is capable of collectively reading a plurality of tags. Therefore, the UHF-band RFID system is advantageous in constructing an article management system in which articles are managed based on ID information read from tags attached to the articles.

Particularly, a wireless IC device disclosed in WO 2009/011154 is useful as an RFID tag used in a system for management of various electronic devices in manufacturing processes and/or at product steps. This wireless IC device uses a ground conductor provided in a printed wiring board incorporated in an electronic device as an antenna element, and therefore, it is not necessary to separately provide an antenna element for exclusive use, leading to size reduction of the tag.

In recent years, size reduction and thickness reduction have been demanded of mobile communication terminals such as smartphones, and there is a trend that the area of an incorporated printed wiring board is reduced. Accordingly, the area of the ground conductor provided in the printed wiring board is also reduced. As a result, the RFID tag which uses the ground conductor as the antenna element has difficulty in securing a sufficient communication distance.

SUMMARY OF THE INVENTION

Preferred embodiments of the present invention provide a communication terminal device including a UHF-band RFID system which secures a sufficient communication distance although it has a small size.

A communication terminal device according to a preferred embodiment of the present invention includes a UHF-band RFID system including a wireless IC element for UHF-band RFID and a loop-shaped conductor coupled to the wireless IC element for UHF-band RFID; and a UHF-band mobile communication system including a wireless IC element for UHF-band mobile communication and an antenna conductor coupled to the wireless IC element for UHF-band mobile communication, wherein the loop-shaped conductor and the antenna conductor are closely adjacent to each other, and the loop-shaped conductor is electromagnetically coupled to a portion of the antenna conductor.

In the above-described communication terminal device, the loop-shaped conductor that is coupled to the wireless IC element for UHF-band RFID is electromagnetically coupled to the antenna conductor that is coupled to the wireless IC element for UHF-band mobile communication. Therefore, wireless communication is established by utilizing the antenna conductor of the UHF-band mobile communication system without providing an antenna element for exclusive use in the UHF-band RFID system. Therefore, in the communication terminal device including the UHF-band RFID system, a sufficient communication distance in the UHF-band RFID system is secured while the communication terminal device is maintained to have a small size.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is an equivalent circuit diagram of a transmission/reception circuit which is a constituent of the communication terminal device.

FIG. 3 is an equivalent circuit diagram of a feeder circuit board which is a constituent of a wireless IC element for UHF-band RFID (first example of a preferred embodiment of the present invention).

FIG. 7 is a graph showing the communication distance of the UHF-band RFID system according to the first example of a preferred embodiment of the present invention.

FIG. 8 is a Smith chart diagram showing the impedance characteristic of the UHF-band RFID system according to the first example of a preferred embodiment of the present invention.

FIG. 9 is a plan view schematically showing a variation of the communication terminal device according to the first example of a preferred embodiment of the present invention.

FIG. 10 is a schematic diagram showing the directional distribution characteristic of the electromagnetic field gain of the UHF-band RFID system in the variation shown in FIG. 9.

DETAILED DESCRIPTION OF THE PREFERRED EMBODIMENTS

Figure 1:
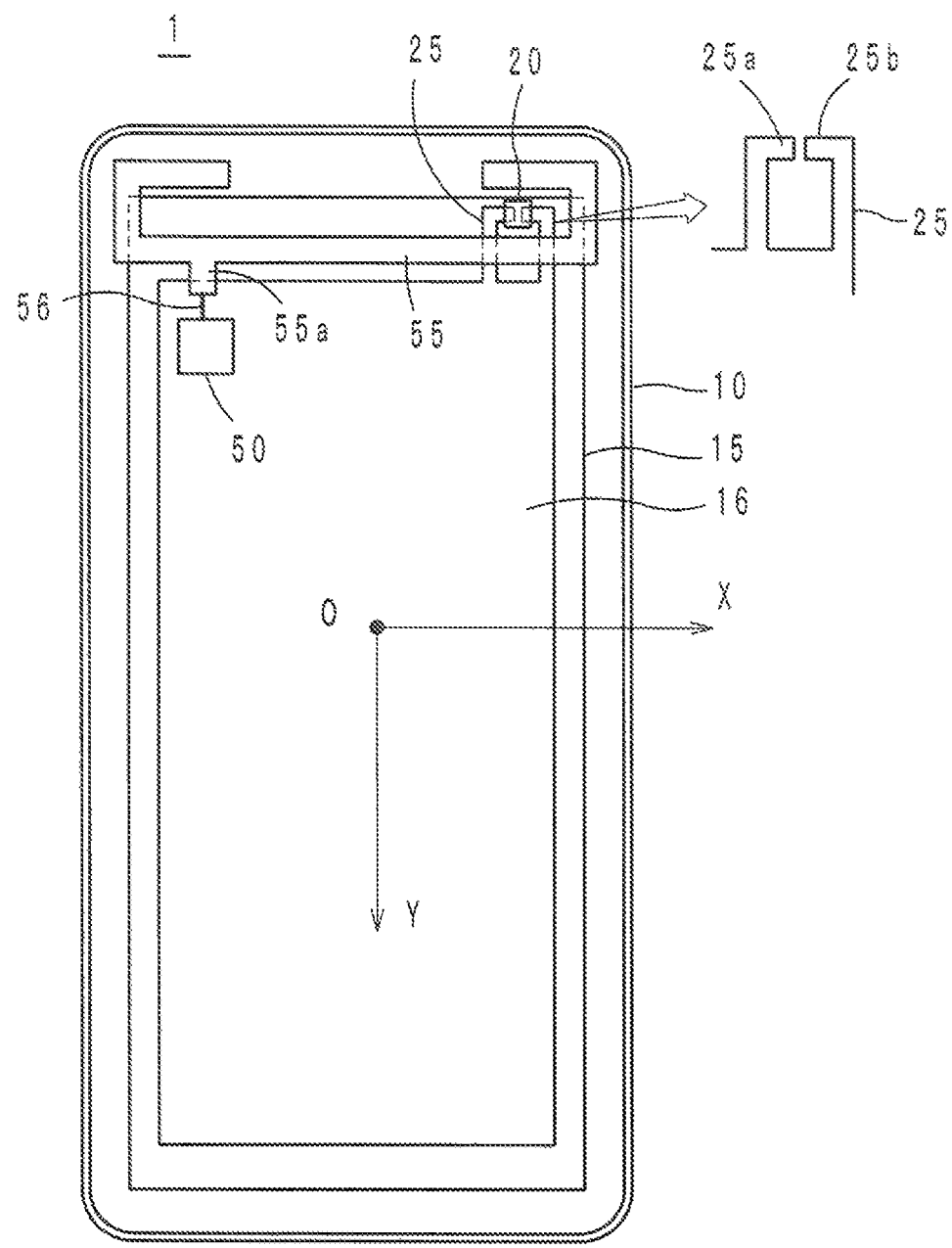
FIG. 1 is a plan view schematically showing a communication terminal device according to a first example of a preferred embodiment of the present invention.

Hereinafter, examples of preferred embodiments of a communication terminal device according to the present invention will be described with reference to the attached drawings.

Common components and parts are referred to using the same reference marks throughout the drawings, and the repetitive description is omitted.

A communication terminal device 1 is a mobile communication terminal including a UHF-band RFID system and a UHF-band mobile communication system. The UHF-band RFID system is an RFID system whose carrier frequency is within a band of around 900 MHz. The UHF-band mobile communication system is a wireless communication system (cellular system) which is compliant with the penta-band of GSM (Global System for Mobile Communication) 850, GSM 900, GSM 1800, GSM 1900, and UMTS (Universal Mobile Telecommunication System). The penta-band compliant wireless communication system uses a band of around 800 MHz (low band) and a band of around 2 GHz (high band) as the carrier frequency. Note that "GSM" is a registered trademark.

The communication terminal device 1 includes a case 10 which has a rectangular or substantially rectangular planar shape. Inside the case 10, various electronic components, such as a printed wiring board 15 and a battery pack (not shown), are provided. The printed wiring board 15 has a ground conductor 16 whose area is equal or substantially equal to that of the printed wiring board 15. The ground conductor 16 is provided in an inner layer of the printed wiring board 15. On the printed wiring board 15, a wireless IC element 20 for UHF-band RFID and a wireless IC element 50 for UHF-band mobile communication are mounted. Other than these elements 20, 50, there are various mounted elements, including various ICs, such as an IC for power feed control and an IC for liquid crystal driving, and various passive elements, such as capacitors and inductors, although none of these is shown in the drawings.

The UHF-band RFID system includes the wireless IC element 20 for UHF-band RFID, a loop-shaped conductor 25, and the ground conductor 16. The wireless IC element 20 for RFID may preferably be a single wireless IC chip which is a semiconductor integrated circuit element configured to process UHF-band RFID signals, or may be realized by a wireless IC module in which a wireless IC chip 21 and a feeder circuit board 30 which will be described in detail later are integrated and the wireless IC chip 21 is overmolded with a resin 23 as in the first example as shown in FIG. 5.

The feeder circuit portion may be defined by a re-distribution layer. The feeder circuit board may be made of a dielectric substance or may be made of a magnetic substance. If the feeder circuit board is made of a magnetic substance, the inductance component is increased.

Figure 4:
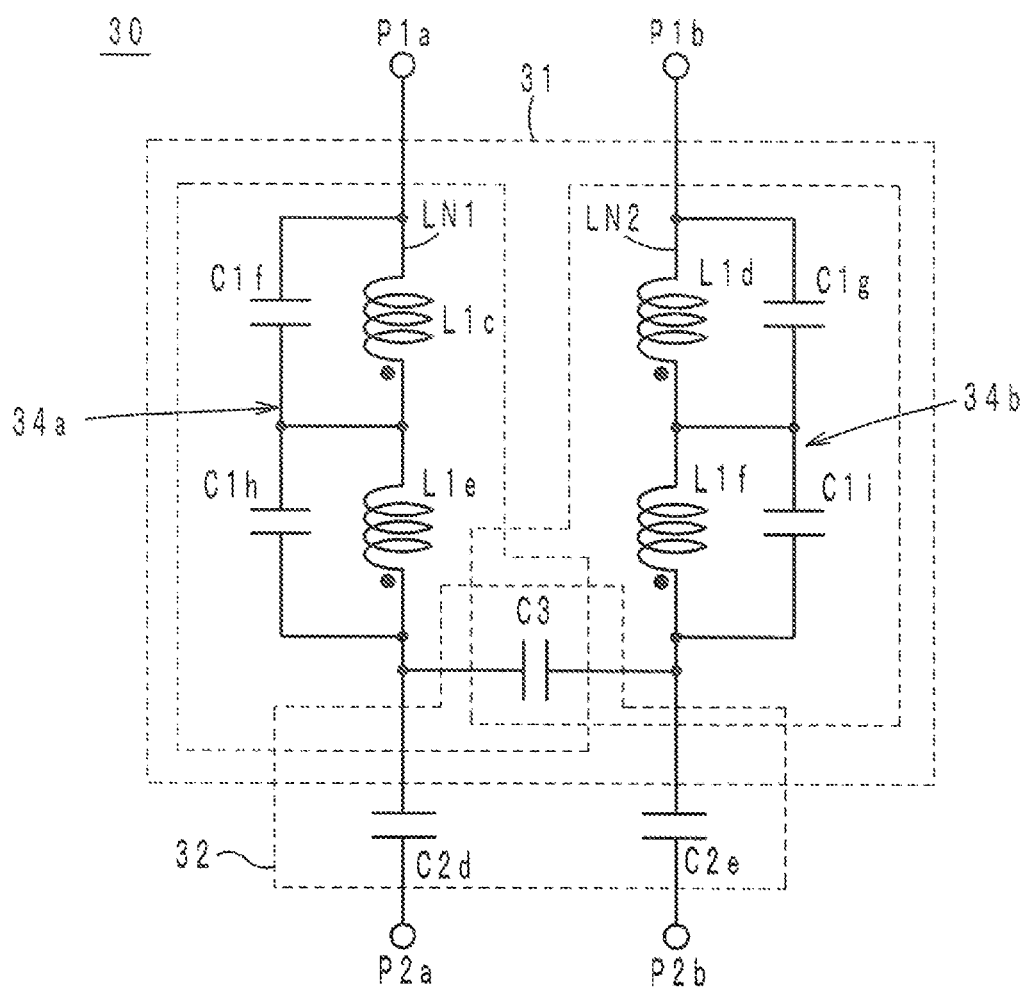
FIG. 4 is an equivalent circuit diagram of a feeder circuit board which is a constituent of a wireless IC element for UHF-band RFID (second example of a preferred embodiment of the present invention).
Figure 5:
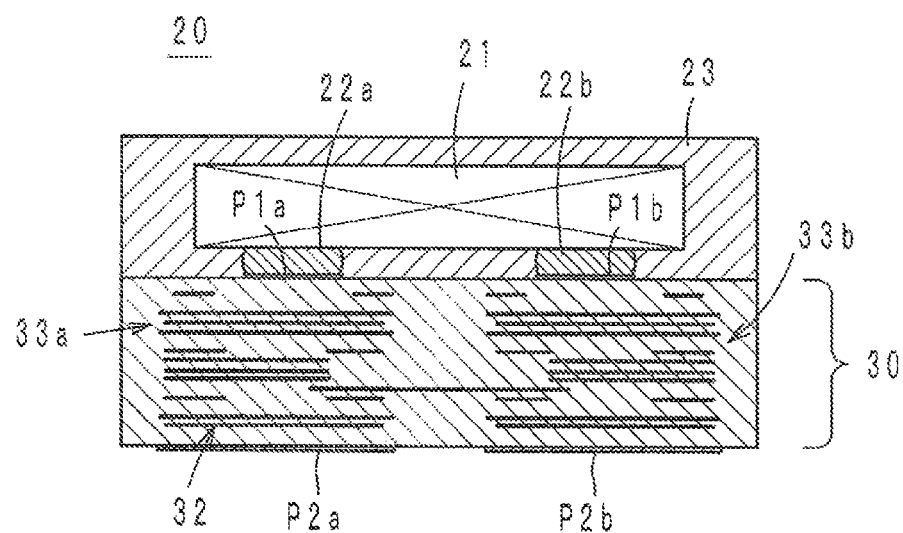
FIG. 5 is a cross-sectional view showing a layered state of the feeder circuit board.

One end 25a and the other end 25b of the loop-shaped conductor 25 are coupled to two input/output terminals of the wireless IC element 20 for RFID (terminals P2a, P2b shown in FIG. 3, FIG. 4, and FIG. 5). Specifically, the loop-shaped conductor 25 is provided in an inner layer of the printed wiring board 15 so as to be coplanar with the ground conductor 16 and extending from the ground conductor 16. The two input/output terminals P2a, P2b of the wireless IC element 20 for RFID are electrically coupled to one end 25a and the other end 25b, respectively, of the loop-shaped conductor 25 via interlayer coupling conductors (not shown). The basal portion of the loop-shaped conductor 25 is electrically coupled to a portion of the ground conductor 16, and the portion of the ground conductor 16 (edge portion) serves as a portion of the loop-shaped conductor 25.

The loop-shaped conductor 25 may be partially divided by a slit, at which capacitance exists. That is, the "loop-shaped" conductor 25 means that it may be in any form so long as a loop-shaped line is equivalently provided in a high frequency band. As for the loop-shaped conductor 25, the inductance component can be controlled by increasing or decreasing the line width or by configuring the loop-shaped conductor 25 so as to partially have a meandering shape. Further, a cutout portion may be partially formed, to which a chip-type inductor or capacitor is to be mounted.

The loop-shaped conductor 25 is configured to match the impedances of the wireless IC element 20 for RFID and the ground conductor 16. Therefore, in the transmitting mode, a transmission signal supplied from the wireless IC element 20 for RFID is guided to the ground conductor 16 via the loop-shaped conductor 25 and radiated from the ground conductor 16 to the outside. In the receiving mode, a reception signal received by the ground conductor 16 is sent to the wireless IC element 20 for RFID via the loop-shaped conductor 25. That is, the ground conductor 16 defines and functions as a radiating element (antenna element) in the RFID system. Note that, however, in recent years, the area of the ground conductor 16 has been decreasing along with size reduction of the communication terminal device 1, so that a sufficient communication distance cannot be secured only by using the ground conductor 16 as a radiating element.

The UHF-band mobile communication system includes the wireless IC element 50 for UHF-band mobile communication, a main antenna conductor 55, and the ground conductor 16. The wireless IC element 50 for UHF-band mobile communication is a semiconductor integrated circuit element configured to process UHF-band wireless communication signals, such as the above-described GSM.

The main antenna conductor 55 is electrically coupled to the antenna terminal of the wireless IC element 50 for communication. The ground conductor 16 is electrically coupled to the ground terminal of the wireless IC element 50 for communication. A matching circuit element (not shown) is provided between the wireless IC element 50 for communication and the main antenna conductor 55. The main antenna conductor 55 is provided in the inner wall portion of the case 10. A feeding portion 55a is electrically coupled to the antenna terminal of the wireless IC element 50 for communication via a feeding pin 56 or via a wire conductor (not shown) provided in the printed wiring board 15. That is, the main antenna conductor 55 is configured as a dipole antenna which utilizes a case current.

More specifically, the main antenna conductor 55 is a T-branched antenna element with both end portions being turned back, which has a low band portion and a high band portion (see FIG. 2). The low band portion is a region which is mainly capable of transmitting and/or receiving high frequency signals at around 900 MHz. The high band portion is a region which is mainly capable of transmitting and/or receiving high frequency signals at around 2 GHz.

The loop-shaped conductor 25 and the main antenna conductor 55 are arranged so as to be closely adjacent to each other and electromagnetically coupled to each other (represented by mark "M" in FIG. 2). More specifically, the loop-shaped conductor 25 and the main antenna conductor 55 are arranged so as to be closely adjacent to each other such that a portion of the loop-shaped conductor 25 and a portion of the main antenna conductor 55 overlap each other when viewed in plan. The loop-shaped conductor 25 is electromagnetically coupled to the low band portion of the main antenna conductor 55.

As described above, in the first example, the loop-shaped conductor 25 which is a constituent of the UHF-band RFID system and the main antenna conductor 55 which is a constituent of the UHF-band mobile communication system are arranged so as to be closely adjacent to each other and electromagnetically coupled to each other. Therefore, wireless communication is established by utilizing the main antenna conductor 55 of the UHF-band mobile communication system in addition to radiation from the ground conductor 16 in the UHF-band RFID system. Thus, in the communication terminal device 1 in which the UHF-band RFID system is incorporated, a sufficient communication distance in the UHF-band RFID system is secured while size reduction of the communication terminal device 1 is achieved.

Figure 6:
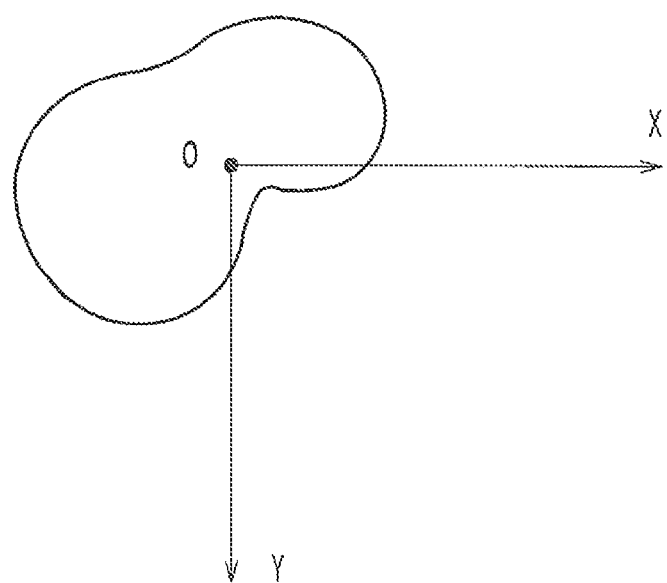
FIG. 6 is a schematic diagram showing the directional distribution characteristic of the electromagnetic field gain of the UHF-band RFID system according to the first example of a preferred embodiment of the present invention.

FIG. 6 is a schematic diagram of the directional distribution characteristic of the electromagnetic field gain of the UHF-band RFID system. In FIG. 6, the origin O of the directional distribution corresponds to the center point O of the case 10 shown in FIG. 1.

FIG. 7 shows the communication distance with respect to the frequency in the UHF-band RFID system. In FIG. 7, curve A represents the communication distance in the first example (in the case where the loop-shaped conductor 25 is electromagnetically coupled to the main antenna conductor 55). Curve B represents the communication distance in a comparative example in which the loop-shaped conductor 25 is not coupled to the main antenna conductor 55. Over a wide frequency range, the first example secures a longer communication distance than the comparative example.

FIG. 8 shows the impedance characteristics of the UHF-band RFID system. In FIG. 8, curve A represents the impedance characteristic of the first example, and curve B represents the impedance characteristic of the above-described comparative example. FIG. 8 illustrates that curves A, B substantially overlap each other, and the impedance characteristics do not substantially vary even when the loop-shaped conductor 25 is electromagnetically coupled to the main antenna conductor 55.

The wireless IC element 20 for RFID preferably is configured as a wireless IC module in which the wireless IC chip 21 and the feeder circuit board 30 are integrated as previously described. In the following section, the feeder circuit board 30 is described.

The feeder circuit board 30 includes a feeder circuit including a filter circuit 31 and a bandwidth expansion circuit 32 as shown in FIG. 3 in the form of an equivalent circuit that is the first example. The filter circuit 31 includes a filter 33a which is provided in a signal line LN1 extending between terminals P1a, P2a and a filter 33b which is provided in a signal line LN2 extending between terminals P1b, P2b. That is, the signal lines LN1, LN2 are equivalent to a differential line, and the filter circuit 31 is equivalent to a balance filter circuit.

More specifically, the terminal P1a is coupled to the terminal P2a via inductors L1g, L1k and a capacitor C2a which are coupled in series. The terminal P1b is coupled to the terminal P2b via inductors L1h, L1m and a capacitor C2b which are coupled in series.

One end of a capacitor C1j is coupled to the node between the inductors L1g, L1k. The other end of the capacitor C1j is coupled to the node between the inductors L1h, L1m via an inductor L1i. One end of a capacitor C1k is coupled to the node between the inductors L1h, L1m. The other end of the capacitor C1k is coupled to the node between the inductors L1g, L1k via an inductor L1j. One end of an inductor L2 is coupled to the node between the inductor L1k and the capacitor C2a. The other end of the inductor L2 is coupled to the node between the inductor L1m and the capacitor C2b.

That is, the filter 33a includes two capacitors C1j, C1k and four inductors L1g, L1k, L1i, L1j. The filter 33b includes two capacitors C1j, C1k and four inductors L1h, L1m, L1i, L1j. The bandwidth expansion circuit 32 includes one inductor L2 and two capacitors C2a, C2b.

The feeder circuit board 30 which has the above-described circuit configuration preferably has a multilayer structure shown in FIG. 5. The terminals P1a, P1b are coupled to the input/output terminals (not shown) of the wireless IC chip 21 via solder 22a, 22b. The terminals P2a, P2b are coupled to one end 25a and the other end 25b, respectively, of the loop-shaped conductor 25 as previously described.

As described above, the capacitor C1j and the inductor L1i which are coupled in series and the capacitor C1k and the inductor L1j which are coupled in series are provided between the signal lines LN1, LN2, such that the resonant frequency is adjusted to a desired value, while reducing the inductance (transmission loss) of the inductors L1g, L1k, L1h, L1m. In such a feeder circuit, harmonic components of communication signals of the UHF-band mobile communication system are attenuated by the filter 33a, and communication signals of the UHF-band RFID system are allowed to pass through the filter 33a.

The feeder circuit board 30 preferably includes an equivalent circuit which is shown in FIG. 4 according to a second example of a preferred embodiment of the present invention. Here, the feeder circuit board 30 includes a feeder circuit which includes the filter circuit 31 and the bandwidth expansion circuit 32. The filter circuit 31 includes a filter 34a provided in the signal line LN1 extending between the terminals P1a, P2a and a filter 34b provided in the signal line LN2 extending between the terminals P1b, P2b.

More specifically, the terminal P1a is coupled to one end of an inductor L1c, and the other end of the inductor L1c is coupled to one end of an inductor L1e. The other end of the inductor L1e is coupled to the terminal P2a via a capacitor C2d. A capacitor C1f is coupled in parallel with the inductor L1c, and a capacitor C1h is coupled in parallel with the inductor L1e.

The terminal P1b is coupled to one end of an inductor L1d, and the other end of the inductor L1d is coupled to one end of an inductor L1f. The other end of the inductor L1f is coupled to the terminal P2b via a capacitor C2e. A capacitor C1g is coupled in parallel with the inductor L1d, and a capacitor C1i is coupled in parallel with the inductor L1f. One end of a capacitor C3 is coupled to the other end of the inductor L1e, and the other end of the capacitor C3 is coupled to the other end of the inductor L1f.

That is, the filter 34a includes two inductors L1c, L1e and three capacitors C1f, C1h, C3. The filter 34b includes two inductors L1d, L1f and three capacitors C1g, C1i, C3. The bandwidth expansion circuit 32 includes three capacitors C2d, C2e, C3.

Now, the reason why the filters are provided in the feeder circuit is described. When a high frequency signal used in the UHF-band mobile communication system is input to the UHF-band RFID system, there is a probability that distortion occurs in the high frequency signal of the mobile communication system so that the communication characteristics vary. Providing the above-described filter circuit in the RFID system prevents the RFID system from varying the communication characteristics of the mobile communication system. Particularly when the frequency bands of both systems are close to each other, there is a probability that harmonic components of the mobile communication system are produced in the RFID system. However, the produced harmonic components are attenuated by the filter circuit provided at the input/output terminal of the RFID system (feeder circuit). Since the filter circuit allows passage of signals used in the RFID system, the filter circuit would not hinder the communication performance of the RFID system. Thus, even when a plurality of communication systems are integrated, the communication characteristics of each communication system can be sufficiently brought out.

FIG. 9 shows a communication terminal device 1A which is a variation of the first example that has previously been described. In the communication terminal device 1A, the loop-shaped conductor 25 is arranged so as to be closely adjacent to the feeding portion 55a of the main antenna conductor 55. In other words, the loop-shaped conductor 25 is positioned on the feeding portion 55a side relative to the longitudinal center of the main antenna conductor 55. The other elements are the same as those of the above-described communication terminal device 1.

In the communication terminal device 1A, the electromagnetically coupled portion of the loop-shaped conductor 25 and the main antenna conductor 55 is closely adjacent to the feeding portion 55a, so that the electromagnetic field gain improves. As seen from FIG. 10, the communication distance in the UHF-band RFID system is long as compared with the characteristic shown in FIG. 6. This is because the loop-shaped conductor 25 is arranged so as to be closely adjacent to the short end (feeding portion 55a) of the main antenna conductor 55 so that magnetic coupling of these elements is improved, and in addition, a quarter wavelength of the main antenna conductor 55 is close to the frequency of the loop-shaped conductor 25 so that an electric current of the loop-shaped conductor 25 is likely to move over to the main antenna conductor 55.

Figure 11:
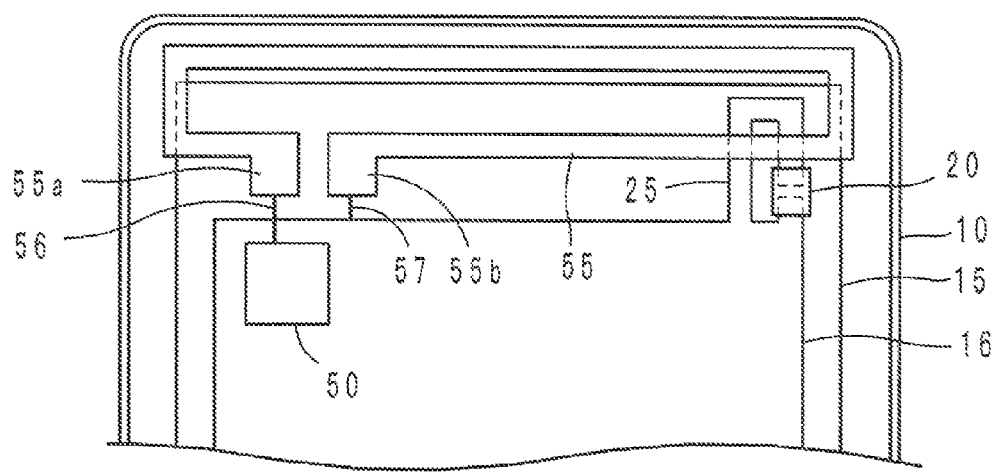
FIG. 11 is a plan view schematically showing a communication terminal device according to the second example of a preferred embodiment of the present invention.

A communication terminal device 2 which is a second example according to a preferred embodiment of the present invention is configured such that the main antenna conductor 55 is a loop-shaped antenna element as shown in FIG. 11. One end of the main antenna conductor 55 serves as the feeding portion 55a, which is electrically coupled to the wireless IC element 50 for communication of the UHF-band mobile communication system. The other end of the main antenna conductor 55 defines and serves as a ground portion 55b, which is electrically coupled to the ground conductor 16 via a coupling pin 57. Further, the low band portion of the main antenna conductor 55 is electromagnetically coupled to the loop-shaped conductor 25. The other elements of the communication terminal device 2 are basically the same as those of the communication terminal device 1 that is the first example. The operations and characteristics of the communication terminal device 2 are also basically the same as those of the communication terminal device 1.

Figure 12:
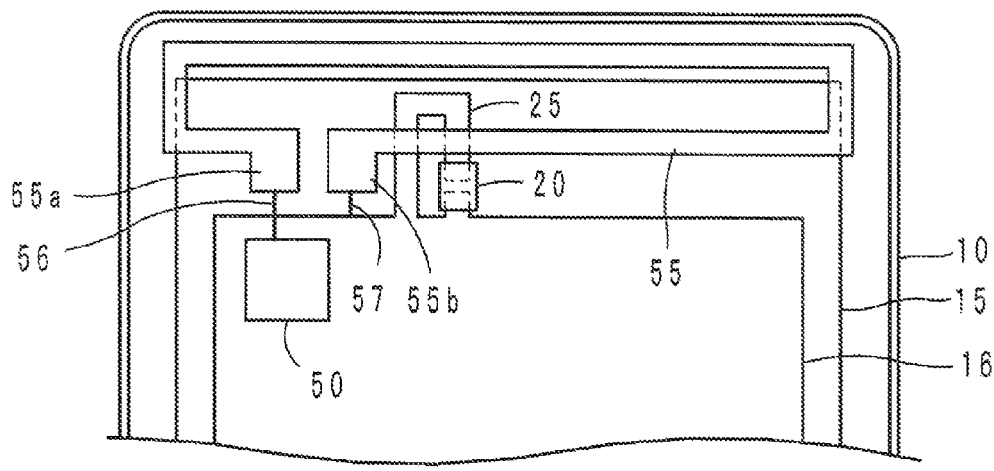
FIG. 12 is a plan view schematically showing a variation of the communication terminal device according to the second example of a preferred embodiment of the present invention.

FIG. 12 shows a communication terminal device 2A which is a variation of the second example according to a preferred embodiment of the present invention that has previously been described. The communication terminal device 2A is configured such that the loop-shaped conductor 25 is arranged so as to be closely adjacent to the feeding portion 55a of the main antenna conductor 55 in the previously-described second example. Thus, the communication distance in the UHF-band RFID system becomes long as in the previously-described variation shown in FIG. 9 (communication terminal device 1A).

Figure 13:
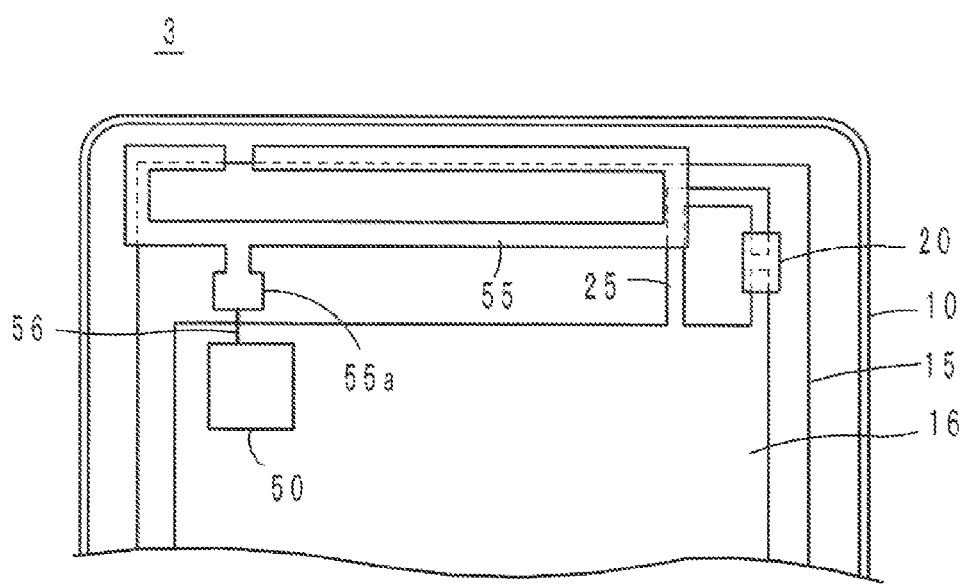
FIG. 13 is a plan view schematically showing a communication terminal device according to the third example of a preferred embodiment of the present invention.

A communication terminal device 3 according to a third example of a preferred embodiment of the present invention is configured such that the main antenna conductor 55 is a turned-back T-branched antenna element as shown in FIG. 13. In the main antenna 55, two turned-back end portions oppose each other so as to be closely adjacent to each other and are coupled to each other via capacitance. The loop-shaped conductor 25 linearly opposes the turning portion of the low band portion of the main antenna conductor 55 and is electromagnetically coupled to the turning portion. The other elements of the communication terminal device 3 are basically the same as those of the communication terminal device 1 that is the first example. The operations and characteristics of the communication terminal device 3 are also basically the same as those of the communication terminal device 1.

Figure 14:
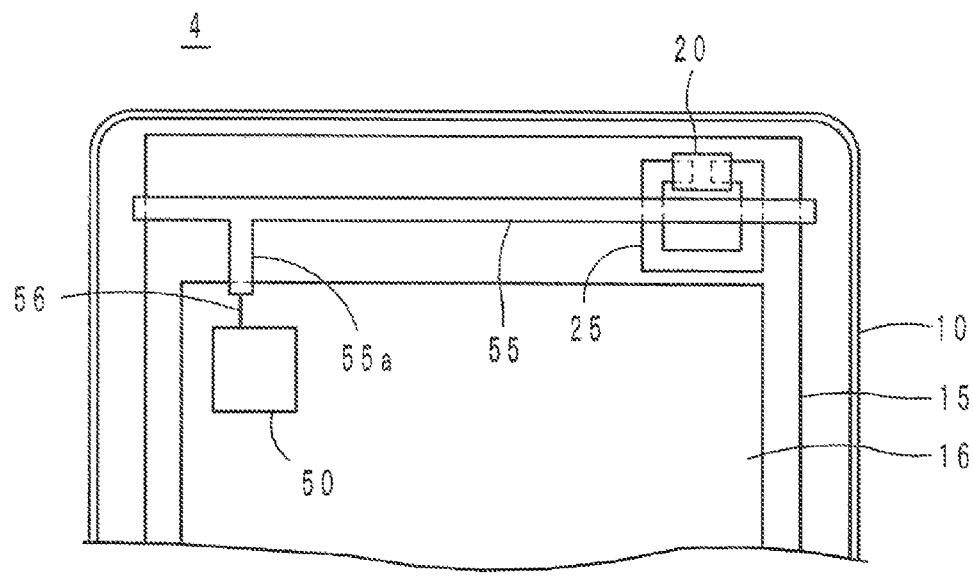
FIG. 14 is a plan view schematically showing a communication terminal device according to the fourth example of a preferred embodiment of the present invention.

A communication terminal device 4 according to a fourth example of a preferred embodiment of the present invention is configured such that, as shown in FIG. 14, the loop-shaped conductor 25 is arranged so as to be closely adjacent to the ground conductor 16, and the loop-shaped conductor 25 and the ground conductor 16 are electromagnetically coupled to each other. The main antenna conductor 55 is a T-branched antenna element with both ends not being turned back. The low band portion is electromagnetically coupled to the loop-shaped conductor 25. The other elements of the communication terminal device 4 are basically the same as those of the communication terminal device 1 that is the first example. The operations and characteristics of the communication terminal device 4 are also basically the same as those of the communication terminal device 1.

Figure 15:
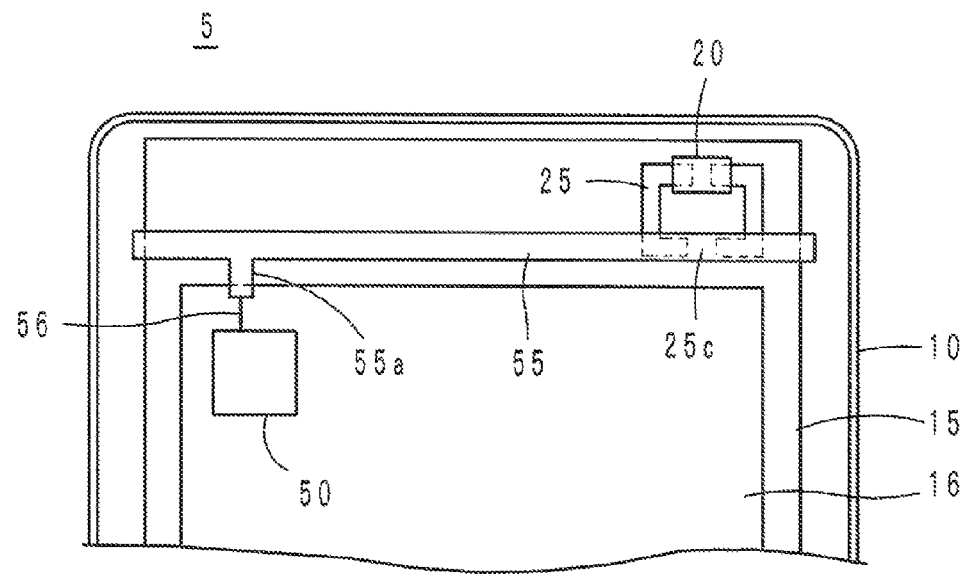
FIG. 15 is a plan view schematically showing a communication terminal device according to the fifth example of a preferred embodiment of the present invention.

A communication terminal device 5 which according to a fifth example of a preferred embodiment of the present invention is configured such that, as shown in FIG. 15, the main antenna conductor 55 is the T-branched antenna element illustrated above in the fourth example. The loop-shaped conductor 25 is arranged so as to be closely adjacent to the ground conductor 16, and the loop-shaped conductor 25 and the ground conductor 16 are electromagnetically coupled to each other. The loop-shaped conductor 25 preferably includes a slit 25c. The portion of the slit 25c opposes the main antenna conductor 55 so as to be closely adjacent to the main antenna conductor 55. Both ends of the slit 25c and the main antenna conductor 55 are coupled to each other via capacitance. That is, although the loop-shaped conductor 25 includes the slit 25c, a loop-shaped line is defined by high frequency components via the capacitance generated between the loop-shaped conductor 25 and the main antenna conductor 55. The other elements of the communication terminal device 5 are basically the same as those of the communication terminal device 1 that is the first example. The operations and characteristics of the communication terminal device 5 are also basically the same as those of the communication terminal device 1.

A communication terminal device according to the present invention is not limited to the above-described examples of various preferred embodiments but can be variously modified within the scope of the spirit of the present invention.

For example, the communication terminal device is not limited to mobile communication terminals such as smartphones, but may be a notebook personal computer, a tablet personal computer, a desktop personal computer, or the like. Also, the planar shape of the case and the printed wiring board of the communication terminal device is not limited to a rectangular or substantially rectangular shape but may be an arbitrary planar shape. The ground conductor may be provided in an outer layer rather than an inner layer of the printed wiring board.

The ground conductor is not limited to one that is provided in the printed wiring board. For example, a metal chassis, a metal case, or the like, may be used as the ground conductor. The loop-shaped conductor may include a cutout portion or opening provided in a portion of the ground conductor and may not necessarily be independent of the ground conductor. Further, the shapes of the loop-shaped conductor and the main antenna conductor are not limited to the combinations which have previously been described in the above examples but may be arbitrarily selected from various combinations within the scope of the spirit of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A communication terminal device comprising:
   a UHF-band RFID system including a wireless IC element for UHF-band RFID and a loop-shaped conductor coupled to the wireless IC element for UHF-band RFID; and
   a UHF-band mobile communication system including a wireless IC element for UHF-band mobile communication and an antenna conductor coupled to the wireless IC element for UHF-band mobile communication; wherein
   the loop-shaped conductor is coupled to a ground conductor provided in a case of the communication terminal device;
   the wireless IC element for UHF-band mobile communication is coupled to the ground conductor;
   the loop-shaped conductor and the antenna conductor are closely adjacent to each other, and the loop-shaped conductor is electromagnetically coupled to a portion of the antenna conductor;
   the loop-shaped conductor is arranged on a feeding portion side of the antenna conductor relative to a longitudinal center of the antenna conductor;
   the antenna conductor includes a first radiating portion and a second radiating portion, the second radiating portion being configured to radiate and/or receive a high frequency signal in a frequency band which is different from that of a high frequency signal that the first radiating portion is capable of radiating and/or receiving; and
   the loop-shaped conductor is electromagnetically coupled to one of the first radiating portion and the second radiating portion of the antenna conductor which is configured to radiate and/or receive a high frequency signal near a UHF band.

2. The communication terminal device according to claim 1, wherein the wireless IC element for RFID is one of a single wireless IC chip and a wireless IC module including a wireless IC chip and a feeder circuit board.

3. The communication terminal device according to claim 1, wherein the loop-shaped conductor includes a slit that partially divides the loop-shaped conductor.

4. The communication terminal device according to claim 1, wherein the antenna conductor is provided in an inner wall portion of the case.

5. The communication terminal device according to claim 1, wherein the antenna conductor defines a dipole antenna.

6. The communication terminal device according to claim 1, wherein the antenna conductor is a T-branched antenna element.

7. The communication terminal device according to claim 1, wherein the loop-shaped conductor is electromagnetically coupled to a low band portion of the antenna conductor.

8. The communication terminal device according to claim 1, wherein the feeder circuit board includes a filter circuit and a bandwidth expansion circuit.

9. The communication terminal device according to claim 1, wherein the antenna conductor a first end that defines a feeding portion and a second end that defines a ground portion.

10. The communication terminal device according to claim 1, wherein the feeding portion is electrically coupled to the wireless element IC for UHF-band RFID.

11. The communication terminal device according to claim 1, wherein the antenna conductor is a turned-back T-branched antenna element.

12. The communication terminal device according to claim 1, wherein the communication terminal device is one of a phone and a computer.

13. The communication terminal device according to claim 1, wherein the ground conductor is one of a printed wiring board, a metal chassis, and a metal case.

14. The communication terminal device according to claim 1, wherein the loop-shaped conductor includes one of a cutout portion and an opening.

15. A communication terminal device comprising:
   a UHF-band RFID system including a wireless IC element for UHF-band RFID and a loop-shaped conductor coupled to the wireless IC element for UHF-band RFID; and
   a UHF-band mobile communication system including a wireless IC element for UHF-band mobile communication and an antenna conductor coupled to the wireless IC element for UHF-band mobile communication; wherein
   a portion of the loop-shaped conductor and a portion of the antenna conductor overlap each other when viewed in plan;
   the loop-shaped conductor and the antenna conductor are closely adjacent to each other, and the loop-shaped conductor is electromagnetically coupled to a portion of the antenna conductor;
   the loop-shaped conductor is arranged on a feeding portion side of the antenna conductor relative to a longitudinal center of the antenna conductor;
   the antenna conductor includes a first radiating portion and a second radiating portion, the second radiating portion being configured to radiate and/or receive a high frequency signal in a frequency band which is different from that of a high frequency signal that the first radiating portion is capable of radiating and/or receiving; and
   the loop-shaped conductor is electromagnetically coupled to one of the first radiating portion and the second radiating portion of the antenna conductor which is configured to radiate and/or receive a high frequency signal near a UHF band.

* * * * *